United States Patent [19]

Muramatsu et al.

[11] Patent Number: 5,057,937
[45] Date of Patent: Oct. 15, 1991

[54] FACSIMILE DEVICE ENABLING EFFICIENT OUTPUT TO RECORD SHEET

[75] Inventors: Hideo Muramatsu; Munehiro Nakatani; Hiroaki Hamano; Shigenobu Fukushima; Toshio Tsuboi; Kanako Hamano; Yoshiyuki Kurahashi; Masanori Yamamoto, all of Osaka, Japan

[73] Assignee: Minolta Camera Kabushiki Kaisha, Osaka, Japan

[21] Appl. No.: 476,625

[22] Filed: Feb. 8, 1990

[30] Foreign Application Priority Data

Feb. 9, 1989 [JP] Japan .................................... 1-30387

[51] Int. Cl.⁵ .................... H04N 1/40; H04N 1/04; H04N 1/38
[52] U.S. Cl. .................................. 358/405; 358/426; 358/449; 358/451
[58] Field of Search ............... 358/405, 437, 445, 449, 358/451, 462, 486, 488, 426, 447; 382/47

[56] References Cited

U.S. PATENT DOCUMENTS

| | | | |
|---|---|---|---|
| 4,356,516 | 10/1982 | Koguchi | 358/486 |
| 4,679,093 | 7/1987 | Yaguchi | 358/449 |
| 4,731,658 | 3/1988 | Koseki | 358/451 |

OTHER PUBLICATIONS

Horlander, "Incremental Scanning for Facsimile", Apr. 1972, pp. 3311–3313.
Huang, "Facsimile Coding by Skipping White", Dec. 1975, pp. 1452–1460.

Primary Examiner—Benjamin R. Fuller
Assistant Examiner—Eric Frahm
Attorney, Agent, or Firm—Burns, Doane, Swecker & Mathis

[57] ABSTRACT

A facsimile device, which receives picture data of an original document, which is constituted by a plurality of data lines, through a telephone line and records the received picture data onto a record sheet, has a counting device for counting the number of the received data lines, an operation device for comparing the number of the data lines with a predetermined value and evaluating the number of data lines exceeding the predetermined value as an excess number, a determination device for determining whether each of the received data lines is valid or invalid picture data, a data processing device for removing the data lines that are invalid picture data, the number of which corresponds to the excess number, out of the received data lines in accordance with the determination by the determination device, and a recording device for recording the remaining received data lines processed by the data processing device onto the record sheet. A processing method is also disclosed and claimed.

9 Claims, 7 Drawing Sheets

TRANSMITTED
PICTURE DATA

RECORD SHEET

FACSIMILE DEVICE ENABLING EFFICIENT OUTPUT TO RECORD SHEET

BACKGROUND OF THE INVENTION

1. Field of the Invention

The present invention relates generally to facsimile devices, and more particularly to a facsimile device employing record paper in the form of cut sheets or rolls.

2. Description of the Related Art

In facsimile devices, in general, additional information including the sending time and date, identification information for the transmit terminal, an indication of pages and the like is transmitted together with picture information to be transmitted so that a receiver can easily identify a transmitter and control a received record by the receiving time and date.

In many cases, since the additional information is indicated on the top line of an original document and thus is transmitted as picture information on the same page prior to the picture information to be transmitted, a received picture occupies a larger area on paper than the original picture of the original document by the length of the additional information.

In a facsimile device employing record paper in a roll, as in conventional, even if the received picture occupies a larger area on the paper than the original picture, the received picture can be outputted as the one printed on one page of the record paper cut at the end of each page, and thus the received picture can appropriately be outputted.

For the record sheet, not only the record sheet in a roll, but also so-called cut paper in the form of sheets, which is prepared in advance in standard sizes, is often employed because it is more advantageous for filing.

However, in a facsimile device using cut sheets, the received picture occupying the larger area than the original picture causes some trouble in that the entire received picture is not included within a cut sheet which corresponds to the size of the original document. As a countermeasure for eliminating the trouble, a facsimile device is disclosed in U.S. Pat. No. 4,731,658 such that when the received picture including the additional information exceeds the size of the cut sheets, the device reduces the entire received picture by a certain magnification with respect to this excess amount and then outputs the reduced received picture to fit within the cut sheets.

It is possible for the above described conventional facsimile device to accommodate the received picture within a predetermined cut sheet size by reducing the received picture. However, the received picture is reduced only in its long direction, thereby causing a deformation of the original picture and thus degrading the resolution inherent to the facsimile device. On the other hand, in the conventional facsimile device employing roll paper, even if the received picture becomes longer, it is outputted without being reduced as above, resulting in no deformation of the original picture or no degraded resolution of the device. However, later copies are, made in general, mainly of the standard size, so that even the roll paper on which a received picture is recorded must inherently be able to be cut in accordance with the standard size, even with no additional information included in the received picture. However, due to the additional information, the roll paper is forced to be cut in nonstandard size, resulting in inconvenience in filing.

SUMMARY OF THE INVENTION

It is an object of the present invention to facilitate the usage of a facsimile device.

It is another object of the present invention to improve output processing to a record sheet in a facsimile device.

It is a further object of the present invention to improve output processing to a record sheet in a facsimile device so that a picture to be recorded can be accommodated in a standard size of the record sheet.

In order to achieve the above objects, according to one aspect, the facsimile device in accordance with the present invention, which receives original picture data of an original document, comprising a plurality of data lines, through a telephone line and records the received picture data on a record sheet, comprises counting means for counting the number of the received data lines, operation means for comparing the number of received data lines with a predetermined value and then evaluating the number of received data lines which exceeds the predetermined value as an excess number, determining means for determining if a received data line is valid or invalid picture data, data processing means for removing received data lines that are invalid picture data, the number of which corresponds to the excess number in accordance with the result of the determination by the determining means, and recording means for recording the remaining received data lines from the data processing means on the record sheet.

In order to attain the above objects, a processing method for the facsimile device in accordance with the present invention, which receives the original picture data which is constituted by the plurality of data lines through the telephone line and records the received picture data on a record sheet, comprises the steps of counting the number of the received data lines comparing the number of received data lines with a predetermined value and then evaluating the number of received data lines exceeding the predetermined value as an excess number, determining whether a received data line is valid or invalid picture data, removing received data lines that are invalid picture data, the number of which corresponds to the excess number out of the received data lines, and recording the remaining received data lines on the record sheet.

In the facsimile device structured as above and by the processing method thereof, since the received data can be recorded on the record sheet after the invalid picture data the number of which corresponds to the excess number is removed from the received data, the received data can be processed on the record sheet of a predetermined size.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
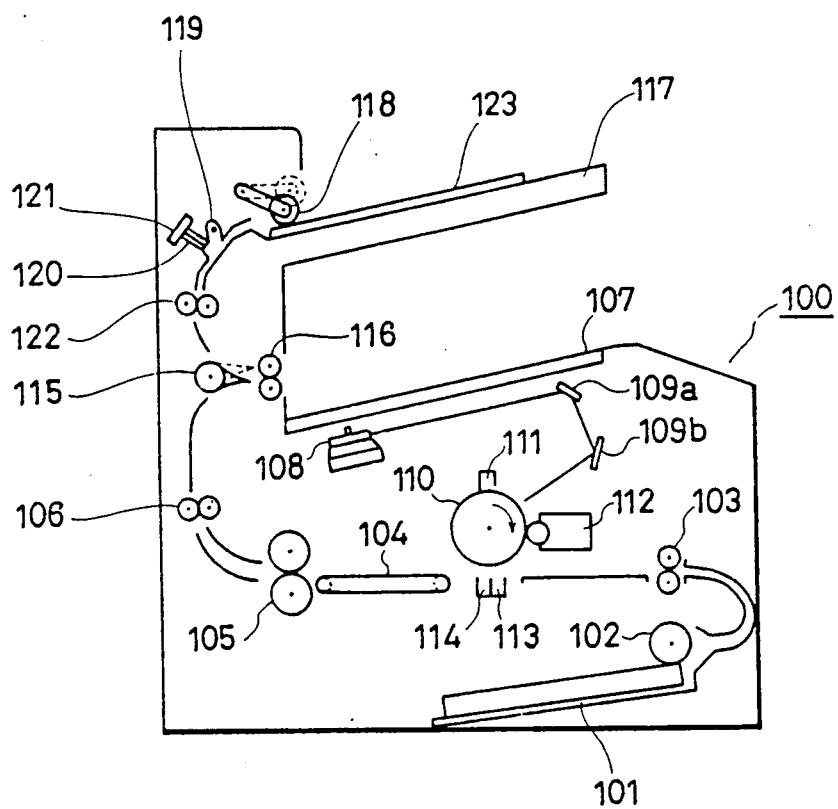
FIG. 1 is a cross sectional view showing the structure of a facsimile device according to one embodiment of the present invention.

FIG. 1 shows a schematic structure of the facsimile device according to one embodiment of this invention.

The structure and operation of the facsimile device will now be described with reference to FIG. 1.

PRINTING OPERATION IN RECEIVING

Received data received by a facsimile device 100 through telecommunication lines is subject to a predetermined processing to be substituted by a light emitting operation of a laser diode and is then led to a photoreceptor 110 rotating in the arrow direction through a polygonal mirror 108 and a planar mirrors 109a and 109b. The photoreceptor 110 is charged by a corona charger 111 in the immediate front of a position to which laser beam is directed. Directing the laser beam results in the formation of an electrostatic latent image. A developing device 112 is provided in the rear of the laser beam-directed position in the direction of the rotation of the photoreceptor 110, so that the electrostatic latent image is revealed with toner of the developing device 112.

In response to the reception of the data, paper of a standard size (e.g. A4 size) fed by a paper feed roller 102 from a paper feed tray 101 is transported in synchronization with revealed image forming timing of the photoreceptor 110 at a timing roller 103. The fed paper is subjected to a transfer of the toner revealed image on the photoreceptor 110 by a transfer charger 113 and is then separated from the photoreceptor drum 110 by a copy paper separation charger 114. The transferred copy paper is then transported on a suction belt 104, so that the toner is fixed onto the paper by a fixing roller 105. The fixed paper is transported by a transport roller 106, guided by a switching claw 115 placed at a position indicated by the broken line and then discharged by a paper discharge roller 116 onto a paper discharge tray 107 with its print face facing downward.

SUBJECT COPY READING OPERATION IN TRANSMITTING

An original document 123 to be transmitted is set on an original document paper feed tray 117 with its transmission face directing upward, i.e., with the first page on the top. When a transmitting operation starts, the top copy paper, i.e., the first page is fed by an original document paper feed roller 118 which is induced from a position of the broken line to that of the solid line. The fed original document has its transmission face irradiated with light from a lamp 119, so that the reflected light thereof is read by an image sensor 121 through a lens array 120. The original document transported by a transport roller 122 and read by the image sensor 121 is guided by the switching claw 115 switched to the position of the solid line and is then discharged onto the paper discharge tray 107 with the transmission face directing downward by the paper discharge roller 116.

Figure 2:
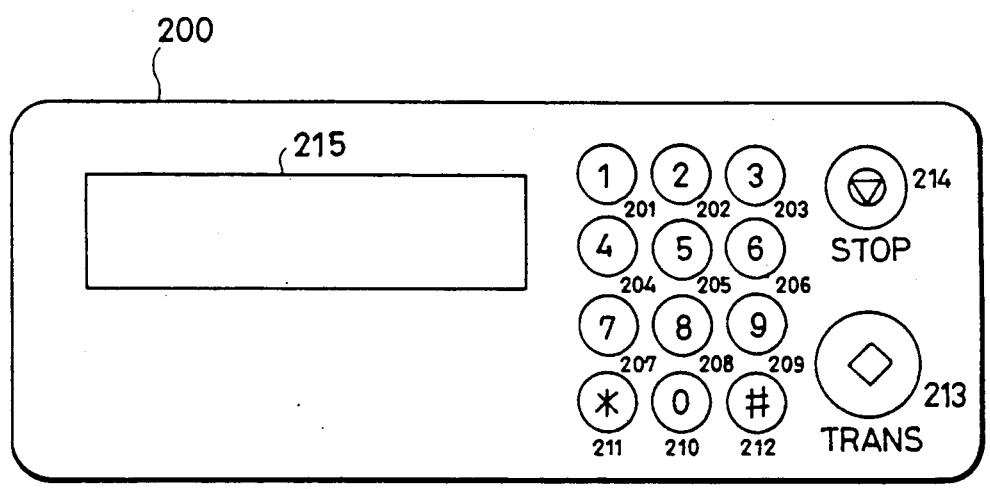
FIG. 2 is a front view of an operating portion provided in the facsimile device of FIG. 1.

FIG. 2 is a front view of an operation panel provided in the facsimile device of FIG. 1.

Referring to this figure, the operation panel comprises a group of ten keys 201-212 for designating a destination, a transmit key 213 for instructing a start of transmission after the original document is set and the destination is designated, a stop key 214 for instructing a stop of transmission after the transmission starts, and a liquid crystal display portion 215 for instructing an operation procedure and displaying a called party's telephone number and the like.

Figure 3:
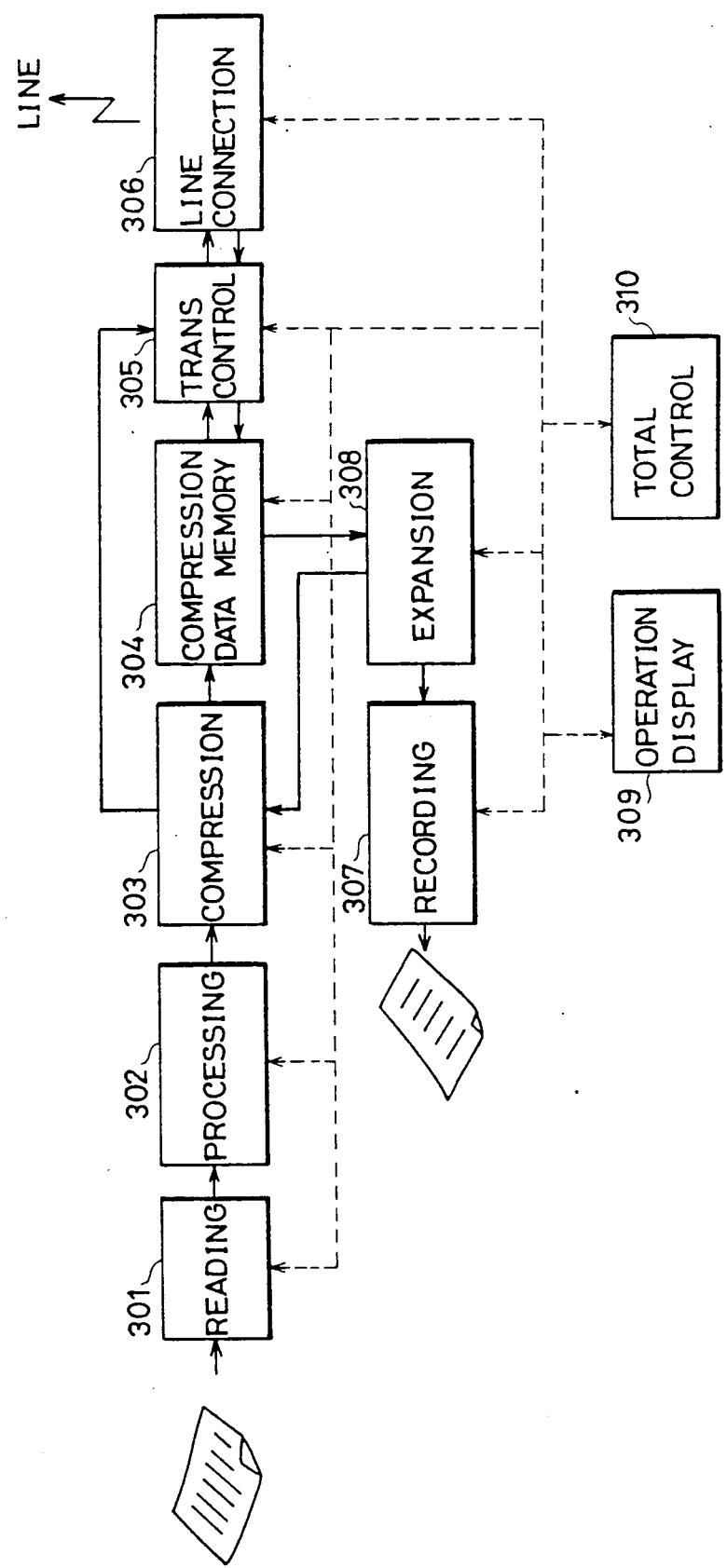
FIG. 3 is a block diagram showing a control scheme of the facsimile device of FIG. 1.

FIG. 3 is a block diagram showing a control scheme of the facsimile device of FIG. 1.

Referring to this figure, a read portion 301 reads a picture on the original document by controlling a scanning drive system including the image sensor 121 and the lamp 119. A picture signal obtained by the reading of the read portion 301 is A/D converted and then undergoes a data correction ($\gamma$, conversion). Thereafter, data processing such as binary processing is carried out in a processing portion 302. The data processed in the processing portion 302 is then compressed by a compression portion 303. This compressed data is once transferred to a compression data memory 304 to be stored therein. Alternatively, the compressed data is directly transferred to a transmission control portion 305. The compression data memory 304 carries out a storage of data from the compression portion 303 (upon transmission) and a storage of data from the transmission control portion 305 (upon reception). In both cases, data is processed with being compression-encoded. Upon transmission, the data from the compression portion 303 or from the memory 304 is converted in the transmission control portion 305 into data of the facsimile device in accordance with CCITT recommendation. Upon reception, the reverse conversion of the data is carried out. Furthermore, upon transmission, serial digital data from the transmission control portion 305 is converted into an analog signal for a public line of telecommunication in a line connecting portion 306, while upon reception, the reverse conversion is carried out. In recording, the received compressed data stored in the compression data memory 304 is expanded, or decompressed, in an expansion portion 308. The expanded data is substituted by the light emitting operation of the laser diode in a recording portion 307. The recording portion 307 further carries out a control of an overall printer portion 100 such as paper transport. An operation display portion 309 carries out input processing and a control of the display content by keying operations on the operation panel 200. A total control portion 310 controls overall the blocks 301-309.

In FIG. 3, the solid line indicates a flow of picture data, and the broken line indicates a flow of a control signal.

Figure 4:
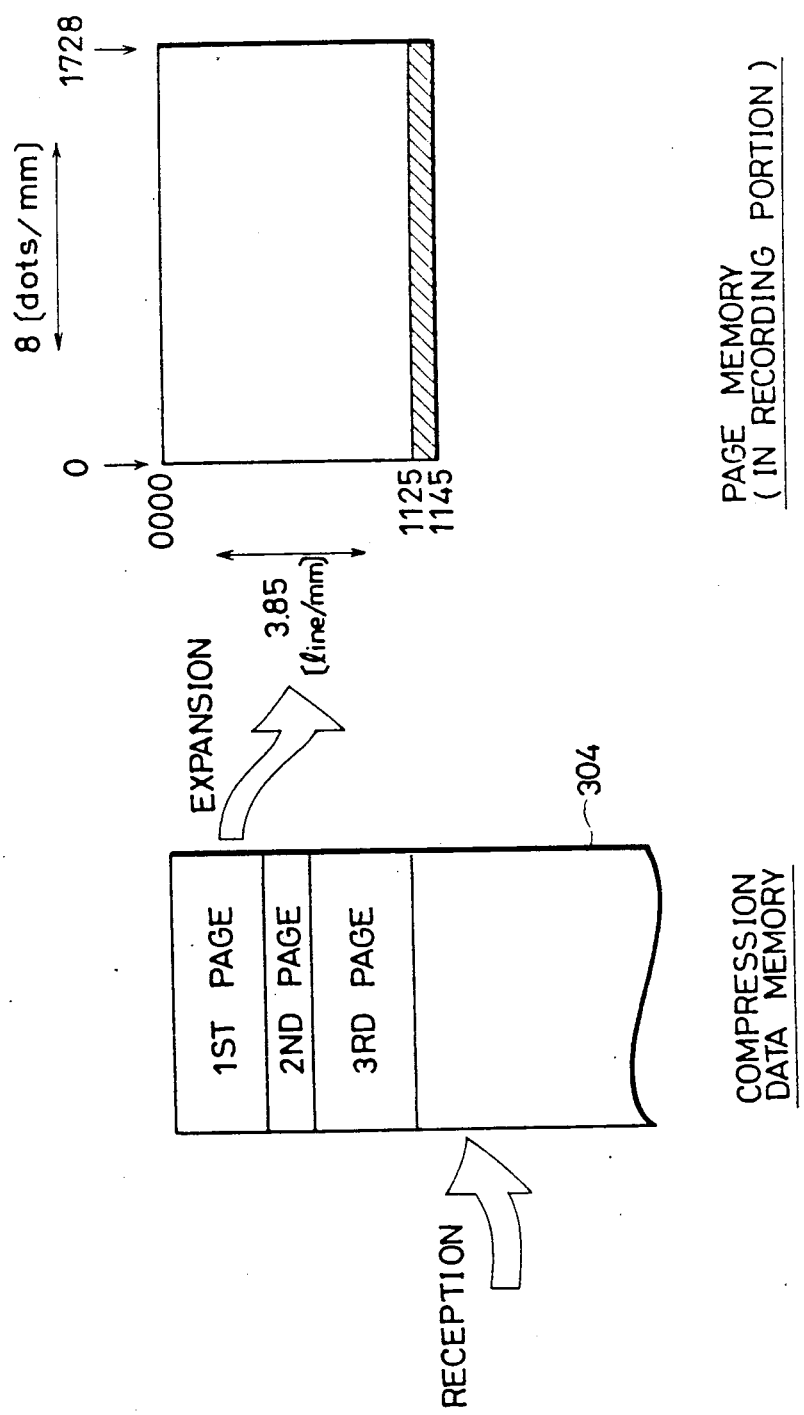
FIG. 4 is a view showing the relationship between a compression data memory and a page memory according to the embodiment of the present invention.

FIG. 4 shows the relationship between the compression data memory and page memory for describing handling of a received picture according to one embodiment of the present invention.

Referring to FIG. 4, the compression data memory 304 stores encoded data of plural pages. The stored data is expanded by the expansion portion 308 and developed to the page memory. This page memory, included in the recording portion 307, has a capacity corresponding to one page of the copy paper. Light is emitted or extinct at the laser diode in accordance with the content of the memory, so that a latent image is formed on the photoreceptor 110.

In standard mode with a width of A4 size, for example, a resolution is 8 dots/mm×216 mm, i.e., 1728 dots in the direction of main scanning (the direction perpendicular to the direction of movement of the original document) and 3.85 line/mm×297, i.e., 1145 lines in the direction of sub-scanning (the same direction as the direction of movement of the original document). However, since the processing at the receiver includes displaying information for printing received data and the like at the 5 mm-wide bottom end (by twenty lines) of the copy paper in order to facilitate controlling of the record sheet, picture data on the lines 1125–1145 in the sub-scanning direction cannot be outputted as a received picture as it is. That is, what can be outputted as the received picture in this store is the picture data in the first 1125 lines.

Figure 5:
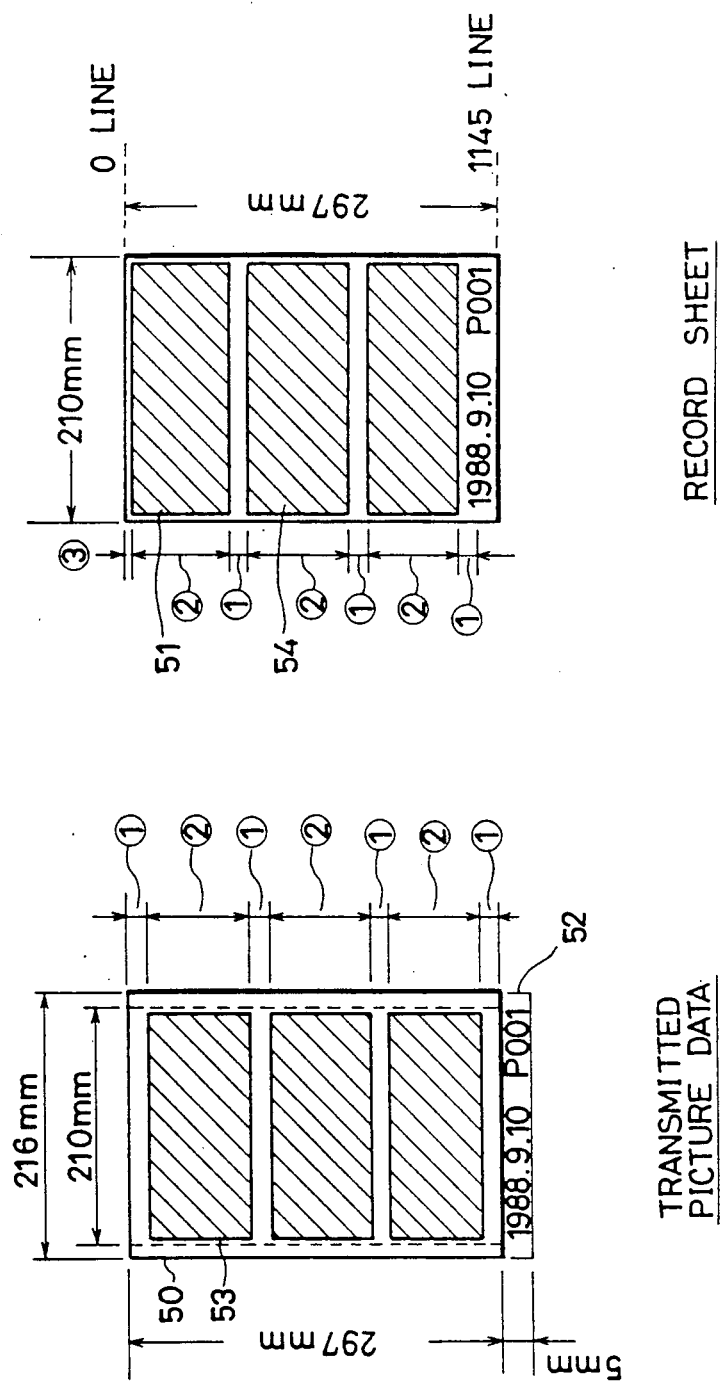
FIG. 5 is a view showing the relationship between original picture data on an original document and a record sheet according to the embodiment of the present invention.

FIG. 5 shows the relationship between the picture data on the original document and the record sheet.

As shown in this figure, according to CCITT recommendation, the dimension of image data 50 transmitted is 216 mm×297 mm if the original document is of A4 size. However, since the dimension of the actual original document 53 (shown by the broken line) is 210 mm×297 mm, 3 mm-wide loss portions, provided respectively at the opposite ends of the picture data 50 due to the dimension 210 mm of a record sheet 51 in a widthwise direction, result in no practical problem. However, the lengthwise dimension 297 mm of the record sheet 51 is 5 mm shorter than a dimension 302 mm which is the sum of the lengthwise dimension 297 mm of the original document picture data and 5 mm of the received data printing information 52, resulting in a record area of information too small by 5 mm. In this embodiment, the information content of the picture 53 on the original document is outputted together with the received data printing information 52 onto one page of the A4-size record sheet 51 without causing any troubles in transmission, even in the above case.

Meanwhile, the overall area of the original document picture to be transferred is in general not occupied only by valid picture data. For example, such a configuration is considered that within an area corresponding to the original document picture denoted by the broken line in the figure, a hatched area ② designates valid picture data (a portion including information to be transmitted), and the other area ① designates invalid picture data (top and bottom margins, spaces after respective paragraphs and the like). In this embodiment, the top margin ① of the original document picture data is partially removed to serve as a top margin ③ of the record sheet 51, and the substantial portion ② of the valid picture data in the original document picture 53 is outputted onto the record sheet 51 as it is. This processing operation becomes possible by sequentially determining the received original document picture data from the line indicating its heading. That is, it is made possible by retrieving the lines constituted by only invalid picture data including no valid picture data, i.e., totally white lines, and removing the required number of totally white lines, namely, the amount of received data printing information in this embodiment.

Figure 6:
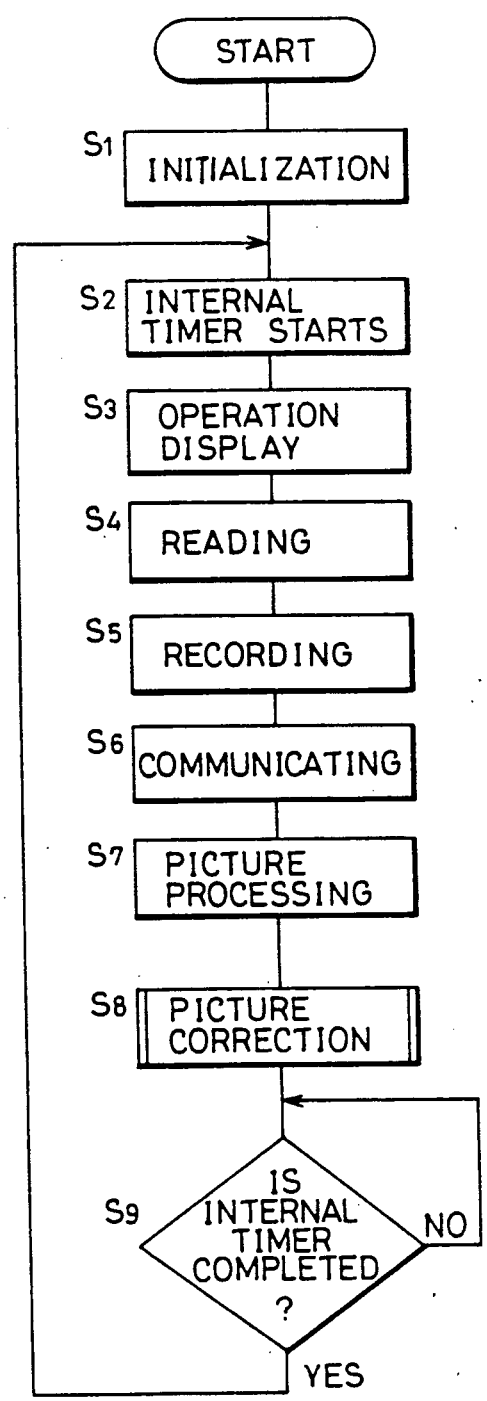
FIG. 6 is a main flow chart showing the content of a control program of a CPU in a total control portion of FIG. 3.

FIG. 6 is a main flow chart of a control program of the CPU in the total control portion 310 of FIG. 3.

First, the state of a counter, a flag and an output port is initialized for the following processings, in step S1. An internal timer for determining the length of one routine starts in step S2. The scanning display portion 309 is controlled in response to the reception of an input signal and a signal output for a display signal in step S3. Controlling the processing portion 302 enables the reading processing by the reading portion 301 for reading the original document picture and the compression processing of the read data, in step S4. A control of the recording portion 307 including the page memory and the like is carried out in step S5. Further, in step S6, telecommunication procedure of the facsimile device, the line connecting portion 306, the transmission control portion 305 and the like are controlled. Controlling the compression portion 303, the expansion portion 308 and the compression data memory 304 leads to the compression and expansion of the data, the control of the compression data memory and the like in step S7. In step S8, the correction of picture data is carried out when the data is transmitted from the expansion portion 308 to the recording portion 307. In step S9, a processing for returning to the step S2 is carried out after waiting for the completion of the internal timer set in step S2. Therefore, the length of one routine is determined by a set value of the internal timer.

Figure 7:
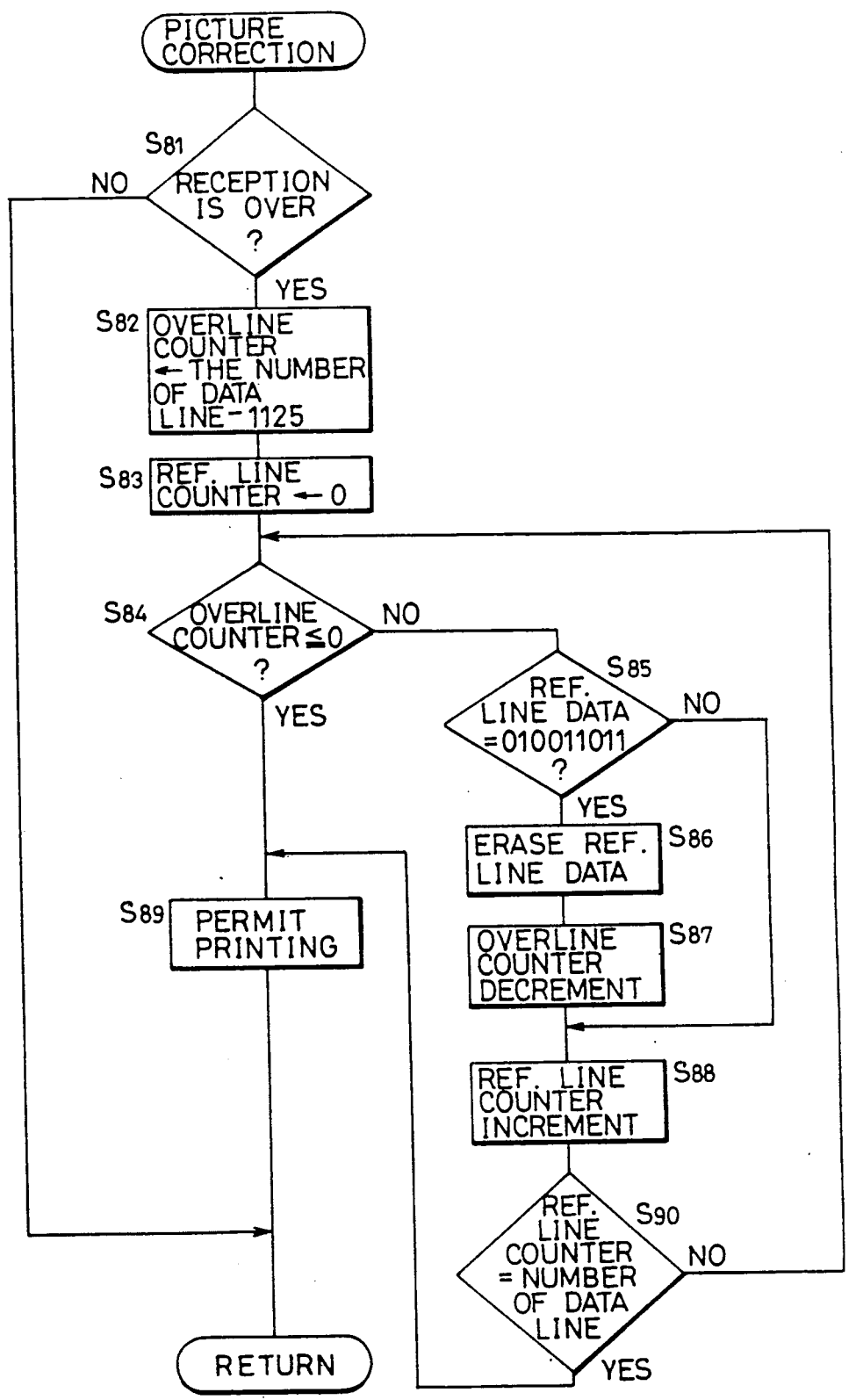
FIG. 7 is a flow chart showing the detailed content of a picture collection routine of FIG. 6.

FIG. 7 is a flow chart of the detailed content of the picture correction routine (S8) of FIG. 6, applied to a record sheet of A4 size.

First, it is decided whether or not the reception of the picture data by one page of the page memory is completed in step S81. When the data receiving is completed (YES in step S81), a value (which is the number of received data lines minus 1125) is set to an "overline counter" indicating the number of lines which cannot be outputted out of the received picture data (step S82). At the same time compressed data stored in the compression data memory during the receiving operation is expanded in step S7 of FIG. 6.

The number of data lines is obtained by counting a code word EOL (End of Line) in accordance with CCITT recommendation indicating the end of the line in the compressed data.

0 is then set for initializing a "reference line counter" in step S83.

Next, it is determined whether or not the value of the overline counter is equal to or below 0 in step S84. If the overline counter indicates 0 or a negative value (YES in step S84), all the received data is outputted without any lack of the data, so that a printing operation is permitted in step S84 (step S89).

On the other hand, if the value of the overline counter is a positive value (NO in step S84), it is decided whether or not the code word of the compressed data on the line instructed by the reference line counter is "010011011" (this code word means that one line is all in white in accordance with CCITT recommendation) in step S85. The one line all in white here means that the line includes no valid picture data as shown by the end margin portion ① of the original document picture data 50 in FIG. 5. If the code word is "010011011", the picture data on the reference line is removed as there is no picture data on that line (step S86). Thus, the value of the overline counter is reduced by 1 (step S87).

When the code word of the compressed data on that line is not "010011011" (NO in step S85) but includes valid picture data, i.e., black data, the value of the overline counter is not reduced, so that the data on that line remains as it is.

When the determination processing in steps S85–87 is completed, the value of the reference line counter is increased by 1 (step S88).

Next, it is decided whether or not the value of the reference line counter is identical to the number of data lines in step S90. The value of the reference line counter being not equal to the number of data lines (NO in step S90) means that the reference is not completed down to the final line of the received data, and hence the procedure returns to the step S84 and the same processing as above is carried out. The value of the reference line counter being equal to the number of data lines (YES in step S90) means that the reference operation is completed for all the lines, thereby permitting the printing in step S89.

While the totally white lines are retrieved from the top end of the received picture data in the above embodiment, they may be retrieved from the bottom end of or partway the picture data.

In addition, when there are successive totally white lines retrieved, they are successively removed in the above embodiment. When there are a plurality of successive portions of the totally white lines, the number of lines to be removed may be distributed into the respective successive portions of the totally white lines.

Furthermore, while the received data printing information is taken as one factor for which the number of lines intended to be outputted is larger than the number of lines which can be outputted on one page of the record sheet in the above embodiment, the present invention can similarly be applied to and have the same effect for other factors such that a picture loss area must be retained resulting from the characteristic of the printer or that the original document is rather lengthy and thus originally includes a lot of received data lines.

When the received picture data is not contained on one page of the record sheet even though all the white line data is removed, the picture data can either be divided into two or more pages or be reduced.

Moreover, while the present invention is applied to the facsimile device using cut paper sheets in the above embodiment, this invention can inevitably be applied to the facsimile device using roll paper. In this case, reducing the length of the roll paper to be used enables the record information, which has conventionally been of nonstandard size, to be accommodated within the standard size, thereby providing more advantages in filing.

As has been described heretofore, the present invention makes it possible to output the received picture onto a desired record sheet or the like, without reducing the valid picture data, by removing the required amount of invalid picture data out of the transmitted picture data. Therefore, it becomes possible to form a picture on the record sheet of a predetermined size or the like without a degradation in the resolution of the picture, resulting in a more convenient and more advantageous facsimile device for use.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A facsimile device for receiving picture data of an original document, which is constituted by a plurality of data lines, through a telephone line and recording the received picture data onto a record sheet, comprising:
   counting means for counting a number of the received data lines;
   operation means for comparing the number of received data lines with a predetermined value and evaluating a number of received data lines exceeding said predetermined value as an excess number;
   determining means for determining whether each of the received data lines is valid or invalid data lines;
   data processing means for removing the received invalid data lines, a number of which correspond to said excess number, in accordance with a result of the determination by said determining means; and
   recording means for recording the remaining received data lines from said data processing means onto the record sheet.

2. The facsimile device in accordance with claim 1, wherein
   said determining means determines the received data lines in order of reception thereof, and
   said data processing means removes the received invalid data lines in the order of receiving the received data lines.

3. The facsimile device in accordance with claim 1, wherein
   said determining means determines the received data lines in opposite order of reception thereof, and
   said data processing means removes the received invalid data lines in the opposite order of receiving the received data lines.

4. A facsimile device for receiving picture data of an original document, which is constituted by a plurality of data lines, through a telephone line and recording the received picture data onto a record sheet, comprising:
   counting means for counting a number of the received data lines;
   operation means for comparing the number of received data lines with a predetermined value and evaluating a number of received data lines exceeding said predetermined value as an excess number;
   determining means for determining whether each of the received data lines is predetermined picture data which comprises totally white lines;
   data processing means for removing data lines that are said predetermined picture data, a number of which correspond to said excess number, out of the received data lines in accordance with a result of the determination by said determining means; and
   recording means for recording remaining received data lines from said data processing means onto said record sheet.

5. A facsimile device for receiving picture data of an original document through a telephone line and recording the received picture data onto a record sheet, comprising:
   counting means for counting an amount of the received picture data;
   operation means for comparing the amount of the received picture data with a predetermined amount and evaluating an amount of the received picture data exceeding said predetermined amount as an excess amount;
   determining means for determining whether the received picture data is predetermined data which comprises totally whites lines;
   data processing means for removing the predetermined data, an amount of which corresponds to said excess amount, out of the received picture data in accordance with a result of the determination by said determining means; and recording means for recording remaining received data from said data processing means onto the record sheet.

6. A processing method for a facsimile device for receiving picture data of an original document, which is constituted by a plurality of data lines, through a telephone line and recording the received picture data onto a record sheet, comprising the steps of:

counting a number of the received data lines;

evaluating a number of received data lines exceeding a predetermined value as an excess number by comparing the number of received data lines with said predetermined value;

determining whether each of the received data lines is valid or invalid picture data;

removing the received invalid data lines, a number of which corresponds to said excess number, out of the received data lines; and recording remaining received data lines onto said record sheet.

7. A processing method for a facsimile device for receiving picture data of an original document, which is constituted by a plurality of data lines, through a telephone line and recording the received picture data onto a record sheet, comprising the steps of:

counting a number of the received data lines;

evaluating a number of received data lines exceeding a predetermined value as an excess number by comparing the number of received data lines with said predetermined value;

determining whether each of the received data lines is predetermined picture data which comprise totally white lines;

removing a number of data lines that are said predetermined picture data, a number of which correspond to said excess number, out of the received data lines; and recording remaining received data lines onto said record sheet.

8. A processing method for a facsimile device for receiving picture data of an original document through a telephone line and recording the received picture data onto a record sheet, comprising the steps of:

counting an amount of the received picture data;

evaluating an amount of the received picture data exceeding a predetermined amount as an excess amount by comparing the amount of the received picture data with said predetermined amount;

determining whether received picture data is predetermined data which comprises totally white lines;

removing the predetermined data, an amount of which corresponds to said excess amount, out of the received picture data; and recording remaining received picture data onto said record sheet.

9. A facsimile device for receiving picture data of an original document through a telephone line and recording the received picture data onto a record sheet, comprising:

counting means for counting an amount of the received picture data;

operation means for comparing the amount of the received picture data with a predetermined amount and evaluating an amount of the received picture data exceeding said predetermined amount as an excess amount;

determining means for determining whether the received picture data is predetermined data which comprises invalid data lines;

data processing means for removing said predetermined data, an amount of which corresponds to said excess amount, out of the received picture data in accordance with a result of the determination by said determining means; and recording means for recording remaining received data from said data processing means onto the record sheet.

* * * * *